United States Patent
Jeon et al.

(10) Patent No.: US 7,184,586 B2
(45) Date of Patent: Feb. 27, 2007

(54) LOCATION MARK DETECTING METHOD FOR ROBOT CLEANER AND ROBOT CLEANER USING THE METHOD

(75) Inventors: Kyong-hui Jeon, Seosan (KR); Jeong-gon Song, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 705 days.

(21) Appl. No.: 10/439,127

(22) Filed: May 15, 2003

(65) Prior Publication Data
US 2004/0156541 A1  Aug. 12, 2004

(30) Foreign Application Priority Data
Feb. 7, 2003  (KR)  ............. 10-2003-0007927

(51) Int. Cl.
*G06K 9/00* (2006.01)
(52) U.S. Cl. ....................................... 382/153
(58) Field of Classification Search ............... None
See application file for complete search history.

(56) References Cited

U.S. PATENT DOCUMENTS 5,525,883 A   6/1996  Avitzour (Continued)

FOREIGN PATENT DOCUMENTS

| DE | 68905290 | 9/1993 |
|---|---|---|
| DE | 4429016 | 2/1996 |
| DE | 10145150 | 5/2002 |
| DE | 10164278 | 10/2002 |
| JP | 60089213 | 5/1985 |
| JP | 2002 182742 | 6/2002 |

(Continued)

OTHER PUBLICATIONS

Fukuda, "Navigation System based on Ceiling Landmark Recognition for Autonomous Mobile Robot," 1993 IEEE.*

(Continued)

*Primary Examiner*—Joseph Mancuso
*Assistant Examiner*—Alex Liew
(74) *Attorney, Agent, or Firm*—Ladas & Parry LLP

(57) ABSTRACT

A location mark detecting method of a robot cleaner capable of accurately detecting location marks from an image captured by an upwardly looking camera. The location mark detecting method comprises the steps of obtaining from the image object marks to be compared with the reference location marks, determining whether shapes of the object marks are identical to those of the reference location marks, determining whether a distance separating the object marks is identical to that between the reference location marks if it is determined that the shapes are identical, determining whether a surrounding image of the object marks is identical to that of the reference location marks if it is determined that the distances are identical, and identifying the object marks as the location marks if it is determined that the surrounding images are identical. A robot cleaner capable of wirelessly communicating with an external device comprises a driving unit, an upwardly-looking camera for capturing an image of a ceiling above an area to be cleaned on which location marks are disposed, and a control unit for detecting the location marks from the image captured by the upwardly-looking camera, the control unit commanding the driving unit utilizing information of the current location to perform a work command.

13 Claims, 6 Drawing Sheets

U.S. PATENT DOCUMENTS

| | | | |
|---|---|---|---|
| 5,999,866 | A | 12/1999 | Kelly et al. |
| 6,459,955 | B1 | 10/2002 | Bartsch et al. |
| 6,496,754 | B2 | 12/2002 | Song et al. |
| 6,914,403 | B2 * | 7/2005 | Tsurumi ................ 318/568.12 |
| 6,978,037 | B1 * | 12/2005 | Fechner et al. ............. 382/103 |
| 2002/0153184 | A1 | 10/2002 | Song et al. |

FOREIGN PATENT DOCUMENTS

| | | |
|---|---|---|
| JP | 2002 183737 | 6/2002 |
| JP | 2002 325708 | 11/2002 |

OTHER PUBLICATIONS

Josep Amat et al. "Optimal landmark pattern for precise mobile robots dead-reckoning." *Proceedings of the 2001/EEE*, International Conference on Robotics & Automation. Seoul, Korea May 21-26, 2001, pp. 3600-3604.

Patent Abstract of Japan deel 009. nr. 236 (P-390), Sep. 21, 1985.

Becker C et al.: "Reliable Navigation Using Landmarks" Proceedings of the International Conference on Robotics and Automation, Nagoya, Japan, May 21-27, 1995, New York, IEEE, US, deel vol. 1, May 21, 1995.

Fukudaa et al.: "Navigation System Based on Ceiling Landmark Recognition for Autonomous Mobile Robot" Proceedings of the 1996 IEEE International Conference on Robotics and Automation, Apr. 1996, bladzijden 1720-1725, SP002294384 Minneapolis US.

Becker C. et al.: "Reliable Navigation Using Landmarks" Proceedings of the International Conference on Robotics and Automation. Nagoya, Japan, May 21-27, 1995, New York, USA.

Fukuda et al.: "Navigation System Based on Ceiling Landmark Recognition For Autonomous Mobile Robot" Proceedings of the 1996 IEEE International Conference on Robotics and Automation, Apr. 1996.

Proceedings of the 1997 IEEE/RSJ International Conference on Intelligent Robots and Systems, Sep. 1997, IEEE, pp. 7-11, vol. 2, Moon et al. "Planning of Vision-Based Navigation for a Mobile Robot Under Uncertainty", see especially chapter 6.

Proceedings of the 1997 IEEE International Conference on Robotics and Automation, Apr. 1997, IEEE, pp. 1993-1998, vol. 3, Abe et al. "Vision Based Navigation System Considering Error Recovery for Autonomous Mobile Robot", see especially chapter 3.

* cited by examiner

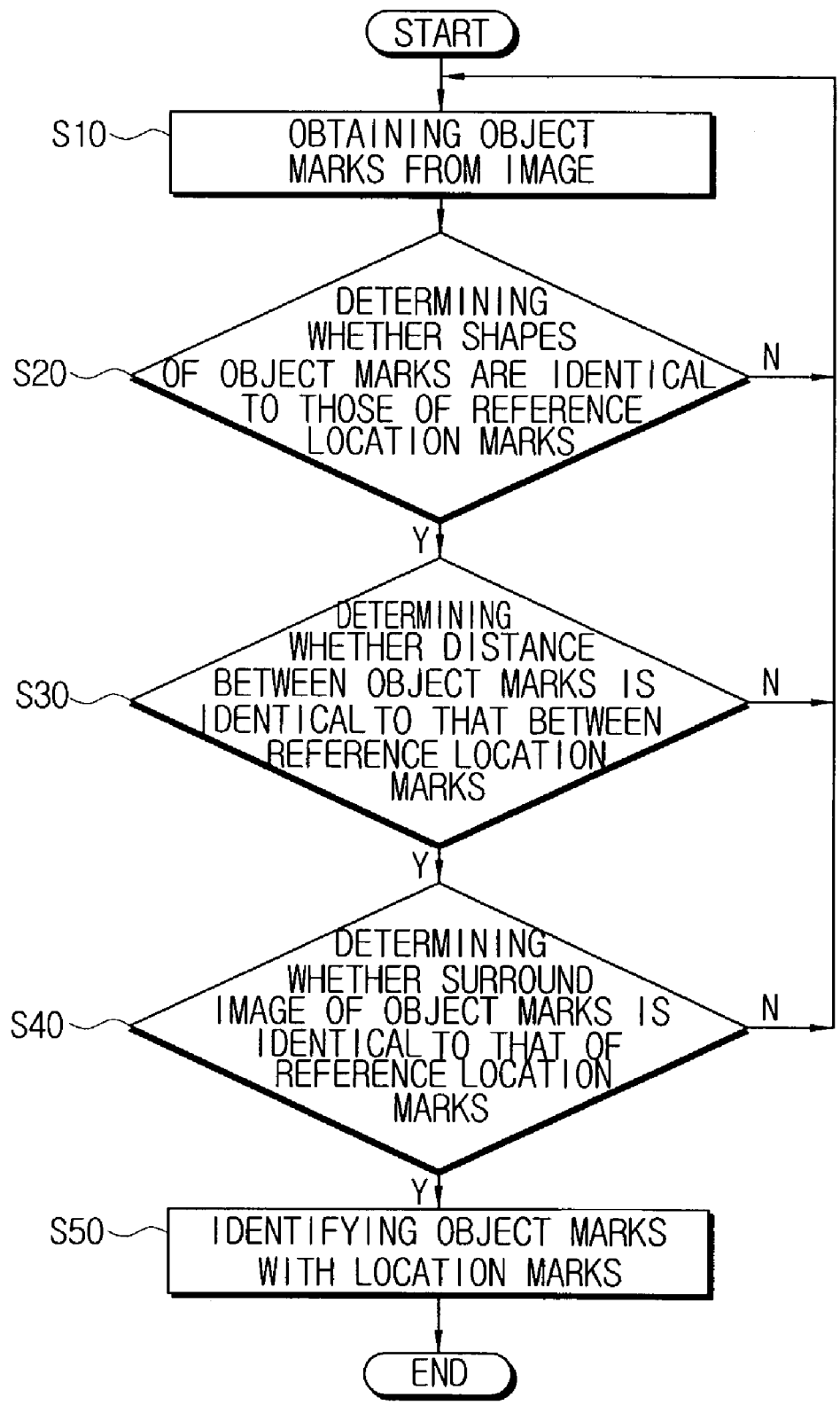

LOCATION MARK DETECTING METHOD FOR ROBOT CLEANER AND ROBOT CLEANER USING THE METHOD

BACKGROUND OF THE INVENTION

1. Field of the Invention

The present invention relates generally to a robot cleaner detecting a current location using a camera while traveling around a working area, and more particularly, to a method of detecting location marks from an image captured by a camera and a robot cleaner using the method.

2. Description of the Background Art

A robot cleaner, which detects its current location using a camera and travels around a working area based on the detected location information to perform a cleaning work, generally includes location marks disposed on a place to be captured by the camera. The location marks generally comprise two marks, which are disposed on a ceiling of the working area apart from each other. The camera is uprightly disposed in a body of the robot cleaner to capture the location marks disposed on the ceiling.

The followings are descriptions about a location mark detecting method in which a control unit of the robot cleaner detects the location marks from an image that is obtained by capturing the location marks-installed-ceiling using the camera.

Firstly, the robot cleaner obtains object marks from the captured image to determine whether they are the location marks or not.

Next, it is determined whether the shapes of the object marks are identical to those of the location marks.

If it is determined that the shapes are identical, it is then also determined whether a distance between the object marks is identical to that between the two location marks.

If it is determined that the distances are identical, the object marks are identified as the location marks that the robot cleaner intends to detect. Accordingly, the control unit of the robot cleaner compares the coordinates of the currently detected location marks with the coordinates of previously detected location marks to detect the current location of the robot cleaner, and accordingly, performs a work command transmitted to the robot cleaner.

However, in the conventional location mark detecting method shown in FIG. 1 of the robot cleaner as described above, it is often the case that the robot cleaner misidentifies structures 91a to 91g as the location marks when the structures 91a to 91g are similar to the location marks 90, artificially disposed on a ceiling of a working area as shown in FIG. 1. If an error occurs in detecting the location marks 90, there is a problem in that the detection error causes an error in the cleaning work and subsequent traveling directions transmitted to the robot cleaner.

Accordingly, there has been requirement for a method in which the robot cleaner correctly detects the location marks, even if there exist structures in the ceiling of the working area having shapes similar to the location marks disposed on the ceiling.

SUMMARY OF THE INVENTION

The present invention has been developed in order to solve the above problem in the prior art. Accordingly, an aspect of the present invention is to provide a method in which a robot cleaner accurately detects location marks even if there exist structures similar to the location marks on a ceiling of a working area.

Also, another aspect of the present invention is to provide a robot cleaner using the method of detecting the location marks.

The above aspect of the present invention is achieved by providing a location mark detecting method used by a robot cleaner, which includes a camera capturing an area on which location marks are disposed, a control unit recognizing a current location based on an image captured by the camera and stored reference location marks, and a driving unit being driven in accordance with a signal of the control unit. In the location mark detecting method of the robot cleaner in which the control unit detects the location marks from the image, the method comprises the steps of obtaining from the image object marks to be compared with the reference location marks, determining whether shapes of the object marks are identical to those of the reference location marks, determining whether a distance between the object marks is identical to that between the reference location marks if it is determined that the shapes are identical, determining whether a surround image of the object marks is identical to that of the reference location marks if it is determined that the distances are identical, and identifying the object marks as the location marks if it is determined that the surround images are identical.

The location marks include two marks disposed apart from each other.

At this point, preferably, one of the two marks is a first mark shaped in a black circle and the other is a second mark shaped in a black circle having the same diameter as that of the first mark or a smaller diameter than that of the first mark. Also, it is preferred that one of the two marks is a first mark shaped in a black circle and the other is a second mark shaped in a black doughnut shape having a white center.

Also, in the location mark detecting method of the robot cleaner according to the present invention, the location marks are disposed on a ceiling of a working area, and the camera is disposed in a body of the robot cleaner uprightly with respect to a traveling direction of the robot cleaner, to capture the ceiling of the working area.

It is preferred that the location marks include two marks disposed apart from each other.

Another aspect of the present invention is achieved by providing a robot cleaner performing a work while wirelessly communicating with an external device. The robot cleaner comprises a driving unit for driving a plurality of wheels, an upper camera for capturing a ceiling of a working area on which location marks are disposed, and a control unit detecting the location marks from the image captured by the camera by referencing shapes, distance, and surround image of reference location marks stored, to thereby perceiving a current location of the robot cleaner. The control unit drives the driving unit utilizing information on the current location to perform a work command.

According to the location mark detecting method of the robot cleaner, the robot cleaner can detect the location marks accurately even in the case that there exists a similar structure to the location marks in the ceiling of the working area.

BRIEF DESCRIPTION OF THE DRAWINGS

The above aspects and other features of the present invention will be more apparent by consideration of a description of a preferred embodiment of the present invention with reference to the accompanying drawings, in which:

FIG. 2 is a flowchart diagram showing a location mark detecting method of a robot cleaner according to a preferred embodiment of the present invention;

DETAILED DESCRIPTION OF THE PREFERRED EMBODIMENT

Hereinafter, the location mark detecting method for a robot cleaner according to a preferred embodiment of the present invention with reference to the accompanying drawings will be described.

Figure 1:
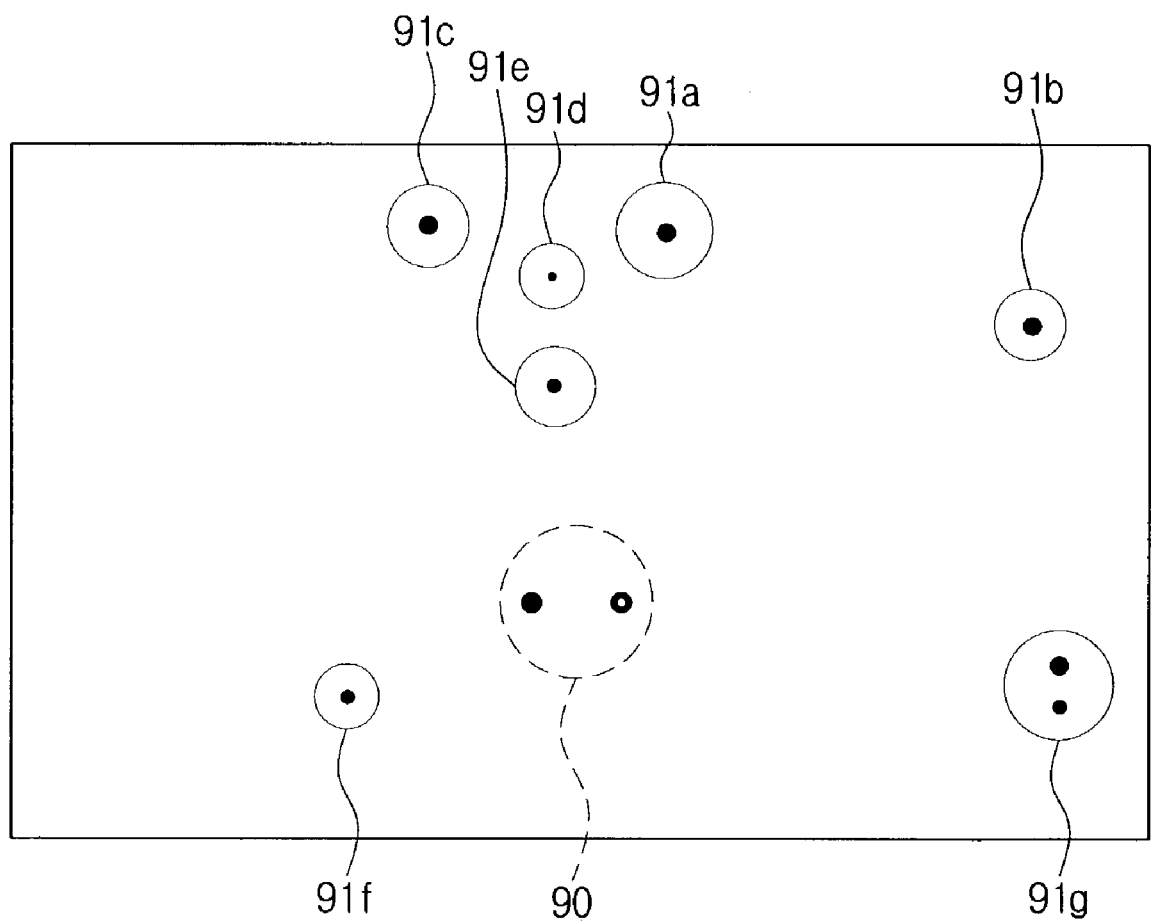
FIG. 1 is a plan view showing an image of a ceiling captured by an upwardly looking camera mounted in a robot cleaner.
Figure 3A:
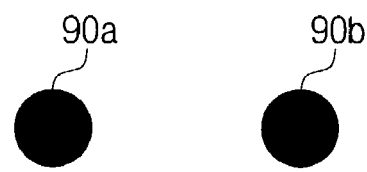
FIGS. 3A to 3C are views showing alternative examples of the location marks to be detected according to the location mark detecting method of the present invention.
Figure 3B:
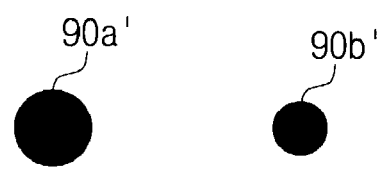
Figure 3C:
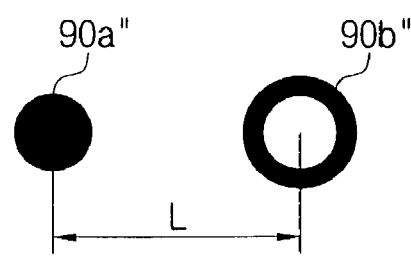

A robot cleaner using a location mark detecting method according to the present invention includes an upwardly looking camera for capturing an image of a location of marks disposed at a fixed place remote from the robot cleaner to create a record of the image, a control unit for detecting location marks from the image created by the upwardly looking camera, and a driving unit being driven by the control unit to perform a given command. The control unit stores therein data about reference location marks to detect the location marks. The data about the reference location marks as stored includes data about the shapes of plural location marks and a distance between the location marks. The control unit also captures a predetermined area of the place on which location marks are disposed using the upwardly looking camera, to store therein the surrounding image of the location marks. The location marks serve as a reference and are used to allow the robot cleaner to perceive its current location from the image captured by the upwardly looking camera. The location marks are shaped so that variations in a moving distance and in a moving direction of the location marks can be calculated. As examples of the location marks, two marks are disposed on a ceiling of a working area apart from each other and separated by a predetermined distance. As shown in FIGS. 3A to 3C, various embodiments of the location marks are schematically illustrated. One embodiment (FIG. 3A) shows a first mark 90*a* and a second mark 90*b*, both marks being shaped like black circles and having the same diameters. Another embodiment (FIG. 3B) shows a first mark 90*a*' shaped as a black circle, and a second mark 90*b*' shaped as a black circle, like the first mark 90*a*', but having a smaller diameter than that of the first mark 90*a*'. Still another embodiment (FIG. 3C) shows a first mark 90*a*" in the shape of a circle and a second mark 90*b*" shaped like a black doughnut. If the location marks 90 are disposed on the ceiling of the working area, the camera has to be disposed in the body of the robot cleaner and should be upwardly looking with respect to a robot traveling direction so as to be capable of capturing images of the ceiling.

A method in which the above-described robot cleaner detects the location marks from the image created by the camera will be described in greater detail with reference to the steps shown in FIG. 2.

First, the robot cleaner captures the image by means of the upwardly looking camera, and stores the captured information regarding the object marks to be compared with the stored reference location marks, as shown in FIG. 2 (S10). The object marks have images that distinguish them from the image of the ceiling, including the image of the location marks 90 and the images of structures 91*a* to 91*g* similar to the location marks 90.

Next, it is determined whether the shapes of the object marks are similar to those of the stored reference location marks (S20). That is, if the location marks 90 have the shapes as shown in FIG. 3C, it is determined whether the first mark 90*a*" is a black circle and then it is determined whether the second mark 90*b*" is a doughnut-shaped black circle.

If it is determined that the shapes of the object marks are identical to those of the reference location marks, it is then determined whether the distance between the object marks is identical to the distance L between the first and the second marks 90*a*" and 90*b*" (FIG. 3C) of the reference location marks (S30). The preferred manner of determining the distance L is to measure the length between the respective center points of the first and second marks 90*a*" and 90*b*".

Figure 4:
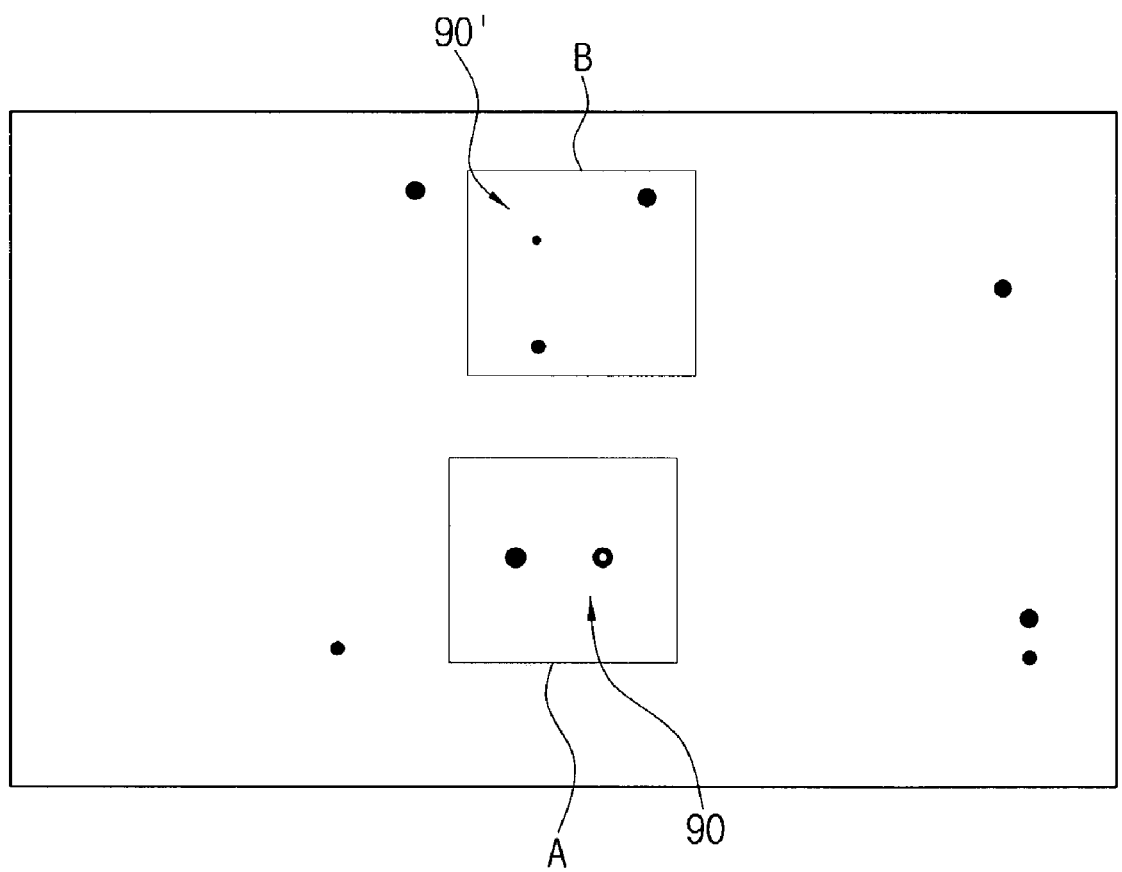
FIG. 4 is a plan view showing the surrounding image of the location marks used in the location mark detecting method of the robot cleaner shown in FIG. 2.

Next, if it is determined that the distance between the object marks is identical to the distance between the reference location marks, it is determined whether the surrounding image of the object mark is identical to the surrounding image of the reference location marks (S40). The surrounding image of the object marks indicates an image B of a predetermined area that surrounds the object marks 90' as shown in FIG. 4. Also, the surrounding image of the location marks indicates an image A of a predetermined area that surrounds the location marks 90 as shown in FIG. 4. At this point, the area of the surrounding image B of the object marks 90' is identical to that of the surrounding image A of the location marks 90. Also, the surrounding image A of the location marks was stored in the control unit after being photographed by the camera. Even when it is determined that the shapes and the distance of the object marks are identical to those of the reference location marks, if the surrounding image B of the object marks 90' is not identical to the surround image A of the location marks, the object marks 90' cannot be identified with the location marks. Accordingly, there occurs no error in which the control unit misidentifies other structures of the ceiling other than the location marks as the location marks. Also, as the method of comparing the surrounding image B of the object marks with the surrounding image A of the location marks, any one of the well-known image comparing methods can be used.

If the surrounding image B of the object marks is identical to the surrounding image A of the location marks, the control unit identifies the object marks with the location marks and obtains their coordinates (S50). Next, the control unit compares the newly obtained coordinates with the previously captured coordinates of the location marks, thereby recognizing the current location of the robot cleaner.

According to the location mark detecting method of the robot cleaner as described above, error in which the robot cleaner misidentifies the structures of the ceiling as the location marks is essentially eliminated.

Figure 5:
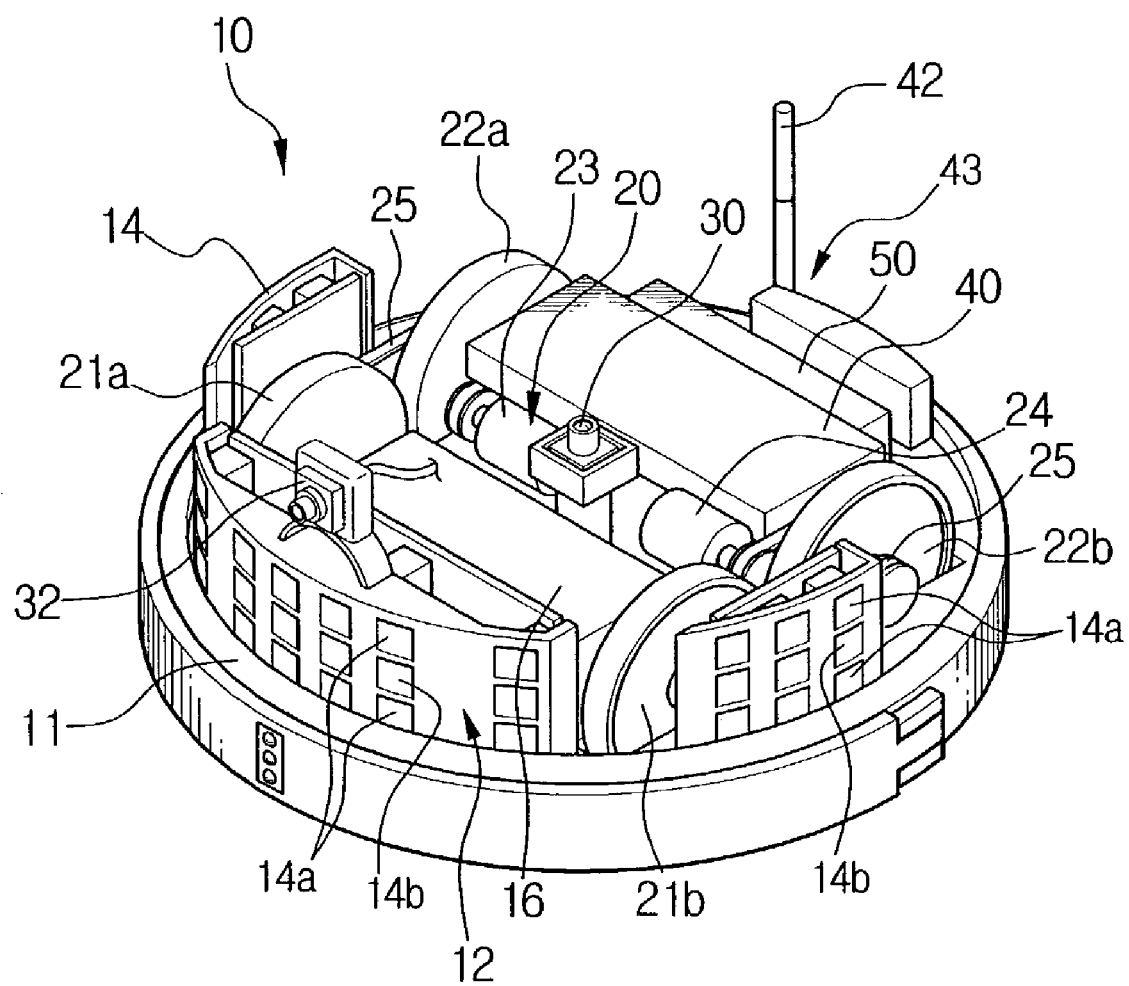
FIG. 5 is a perspective view showing the uncovered body of a robot cleaner.
Figure 6:
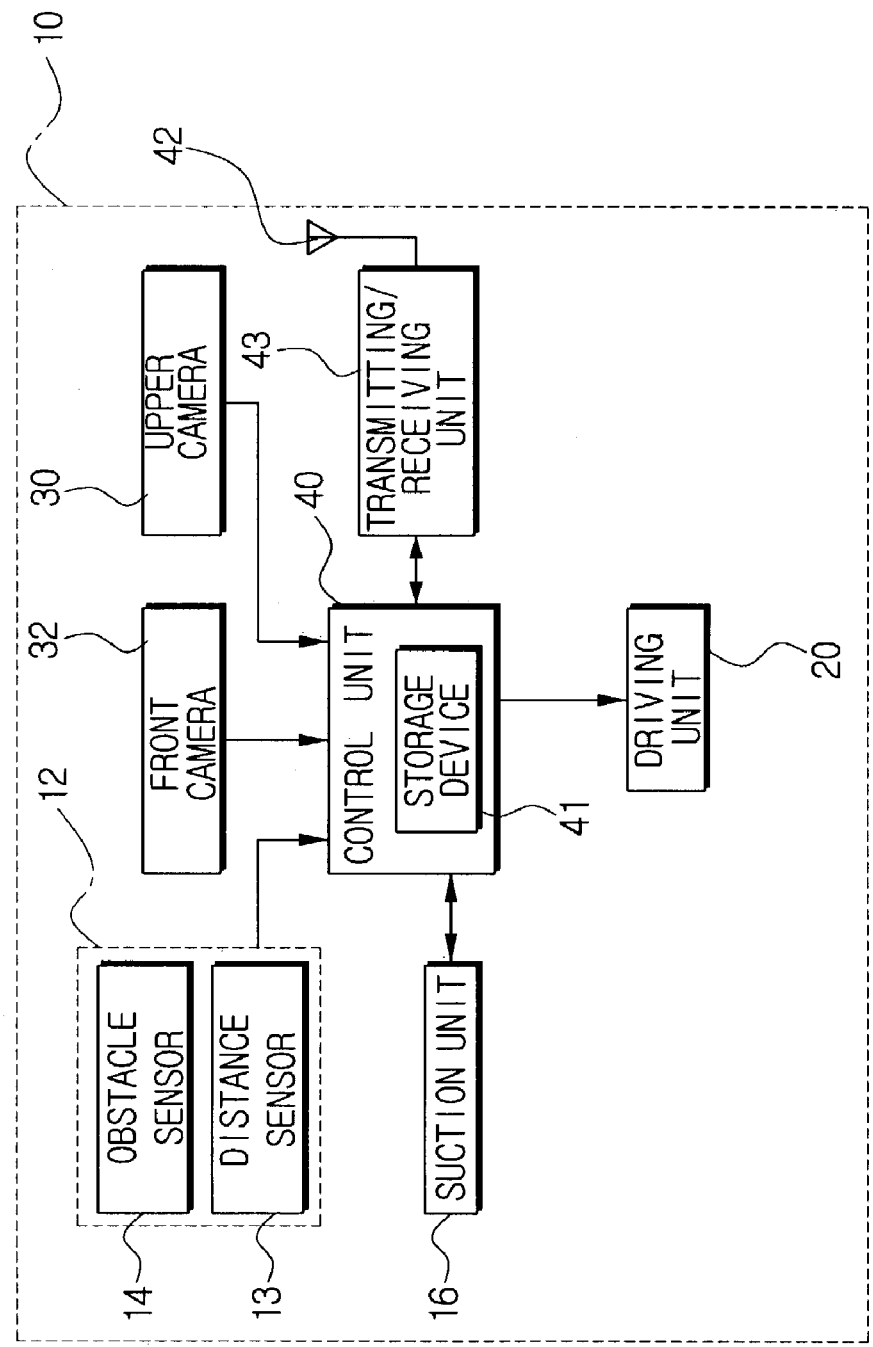
FIG. 6 is a block diagram showing the elements of the robot cleaner shown in FIG. 5

FIGS. 5 and 6 are a perspective view and a block diagram, respectively, showing a robot cleaner with its cover removed, the robot cleaner employing the location mark detecting method according to a preferred embodiment of the present invention.

Referring to FIGS. 5 and 6, a robot cleaner 10 includes a body 11, a suction unit 16, a driving unit 20, an upwardly looking camera 30, a front camera 32, a control unit 40, a transmitting/receiving unit 43, a sensing unit 12, and a rechargeable battery 50.

The suction unit 16 is disposed in the body 11, opposite to a surface that is being cleaned, so as to collect dust from the surface by air suction. The suction unit 16 can be embodied by providing one of various well-known methods. By way of an example, the suction unit 16 may include a suction motor (not shown) and a dust collecting chamber for collecting the drawn-in dust through a suction port or a suction pipe opposite to the surface being cleaned by driving the suction motor.

The driving unit 20 includes two front wheels 21a, 21b disposed at both front sides, two rear wheels 22a, 22b disposed at both rear sides, motors 23, 24 for respectively rotating the two rear wheels 22a, 22b, and timing belts 25 for transmitting driving forces of the rear wheels 22a, 22b to the front wheels 21a, 21b. The driving unit 20 rotatably drives the respective motors 23, 24 in a normal direction or a reverse direction, independently, in accordance with a control signal received from the control unit 40. A traveling direction is determined by controlling the respective RPMs of the motors 23, 24, either rotating simultaneously or in opposite directions, depending on the desired direction of travel of the robot cleaner 10.

The front camera 32 is disposed in the body 11 and is used for capturing a forward-looking image and outputting the image to the control unit 40.

The upwardly looking camera 30 is disposed in the body 11 for capturing the location marks 90 (FIG. 4) disposed on a ceiling of an area to be cleaned and outputting the image to the control unit 40. The front and the upwardly looking cameras 32, 30 generally use a CCD camera.

The sensing unit 12 includes one or more obstacle sensors 14 arranged around an outer circumference of the body 11 at predetermined intervals, for transmitting a signal to the outside and receiving a reflected signal, and a distance sensor 13 for detecting the traveling distance.

The obstacle sensors 14 include infrared ray emitting elements 14a for emitting infrared rays and light receiving elements 14b for receiving the reflected light. A plurality of the infrared ray emitting elements 14a and of the light receiving elements 14b are arranged in parallel as vertically extending lines along the outer circumference of the body 11. Alternatively, the obstacle sensors 14 may employ an ultrasonic wave sensor for emitting an ultrasonic wave and receiving a reflected ultrasonic wave. The obstacle sensors 14 are used to measure the distance to an obstacle or wall.

The distance sensor 13 may comprise a rotation detecting sensor for detecting RPMs of the wheels 21a, 21b, 22a, 22b. For example, the rotation detecting sensor uses an encoder for detecting RPMs of the motors 23, 24.

The transmitting/receiving unit 43 sends out data signals via an antenna 42 and transmits a signal to the control unit 40 that is received via the antenna 42.

The rechargeable battery 50 is disposed in the body 11 for supplying the motors 23, 24 and the control unit 40 with power needed for driving the robot cleaner 10 and for other operations.

The control unit 40 processes the signal received through the transmitting/receiving unit 43 and controls the respective components. If a key input device having a plurality of keys for manipulating functions of the components provided in the body 11 is included, the control unit 40 processes key signals inputted from the key input device.

From the image captured by the upwardly looking camera 30, the control unit 40 detects the location marks 90 (FIG. 4) disposed on the ceiling of the area to be cleaned, which marks 90 are used as a reference to perceive the current location of the robot cleaner, and then calculates their coordinates. After that, the control unit 40 calculates variations in a moving direction and in moving distances of the location marks 90 based on the image captured by the upwardly looking camera 30 to thereby calculate the current location of the robot cleaner 10. Also, the control unit 40 controls the respective components, such as the driving unit 20, according to information of the calculated current location to perform a work command.

Basic image information on the reference location marks is stored in a data storage device 41 (FIG. 6) of the control unit 40 to allow the control unit 40 to detect the location marks 90 from the image photographed by the upwardly looking camera 30.

The following will describe an operational method by which the control unit perceives the current location of the robot cleaner 10. First, the control unit 40 controls the upwardly looking camera 30 to capture an image of the ceiling above an area to be cleaned, thereby creating an upper image. After that, the control unit 40 references the information on the reference location marks stored in the data storage device 41, to thereby detect the location marks 90 based on the upward-looking image.

A method by which the control unit 40 detects the location marks 90 from the upward-looking image will be described in greater detail. First, the control unit 40 obtains from the upward-looking image the object marks to be compared with the reference location marks. Then, the control unit 40 determines whether the shapes of the object marks are identical to those of the reference location marks. If it is determined that the shapes are identical, the control unit 40 determines whether the distance between the object marks is identical to that between the reference location marks. If it is determined that the distances are identical, the control unit 40 determines whether the surrounding image B of the object marks is identical to the surrounding image A of the reference location marks. If it is also determined that the surrounding image B is identical to the surrounding image A, the control unit 40 identifies the object marks as the location marks 90. When the control unit 40 detects the location marks 90 from the upward-looking image, since it takes into account of the comparison of the surrounding image A of the location marks 90, there occurs no error in which the control unit 40 misidentifies a similar structure of the ceiling within the upper image as the location marks 90.

After detecting the location marks 90 from the upward-looking image through the above-described process, the control unit 40 calculates the coordinates and directional orientation of the detected location marks 90. After that, the control unit 40 allows the robot cleaner 10 to move by driving the driving unit 20 and then captures the ceiling using the camera to create a new upward-looking image. From the new upward-looking image, the control unit 40 detects the location marks 90 and calculates coordinates and direction thereof. Next, by calculating variations in the coordinates and in the directional orientation of the location marks 90, the control unit 40 perceives the current location of the robot cleaner 10. With the perception of the current location, the robot cleaner 10 performs a work command within the area to be cleaned.

According to the location mark detecting method of the robot cleaner as described above, the robot cleaner can detect the location marks accurately from the image captured by the upwardly looking camera even in the case that there exists a similar structure to the location marks in the ceiling of the working area. Accordingly, no error is encountered during operation and traveling of the robot cleaner.

The foregoing embodiments and advantages are merely exemplary and are not to be construed as limiting the scope of the present invention. The present teaching can be readily applied to other types of apparatus. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A location mark detecting method used by a robot cleaner, which includes an upwardly-looking camera capturing an area on which location marks are disposed, a control unit recognizing a current location of the robot cleaner based on information in a single image captured by the camera and reference location marks stored in a storage, and a driving unit being driven in accordance with a signal of the control unit, in the location mark detecting method the control unit detecting the location marks from the image, the method comprising the steps of:

obtaining from the single image, first and second object marks to be compared with the stored reference location marks;
   determining whether the shapes of the object marks are identical to those of the stored reference location marks;
   determining whether the distance between the object marks is identical to the distance between the reference location marks if it is determined that the shapes are identical;
   determining whether a surrounding image of the object marks is identical to an image surrounding that of the reference location marks if it is determined that the distances are identical; and
   identifying the object marks as the location marks if it is determined that the surrounding images are identical.

2. The location mark detecting method of the robot cleaner of claim 1, wherein the location marks include two marks disposed separated from each other.

3. The location mark detecting method of the robot cleaner of claim 2, wherein one of the two marks is a first mark shaped as a black circle and the other is a second mark shaped as a black circle having the same diameter as that of the first mark or a smaller diameter than that of the first mark.

4. The location mark detecting method of the robot cleaner of claim 2, wherein one of the two marks is a first mark shaped in a black circle and the other is a second mark shaped in a black doughnut shape.

5. The location mark detecting method of claim 1, wherein the location marks are disposed on a ceiling of an area to be cleaned.

6. The location mark detecting method of claim 1, wherein the camera is disposed in a body of the robot cleaner upwardly-looking with respect to the direction of travel of the robot cleaner, so as to capture the ceiling of the area to be cleaned.

7. The location mark detecting method of claim 6, wherein the location marks include two marks disposed separated from each other.

8. The location mark detecting method of claim 7, wherein one of the two marks is a first mark shaped as a black circle and the other is a second mark shaped as a black circle having the same diameter as that of the first mark or a smaller diameter than that of the first mark.

9. The location mark detecting method of claim 7, wherein one the two marks is a first mark shaped as a black circle and the other is a second mark shaped as a black doughnut shape.

10. A robot cleaner performing an operation while wirelessly communicating with an external device, the robot cleaner comprising:

a driving unit for driving a plurality of wheels;
    an upwardly-looking camera for capturing an image on a ceiling above an area to be cleaned, said ceiling being where location marks are disposed; and
    a control unit for detecting the location marks from a single image captured by the upwardly looking camera by referencing shapes, distance, and images surrounding the stored reference location marks, to thereby perceive the current location of the robot cleaner, and
    the control unit commands the driving unit utilizing information of the current location to perform a work command.

11. The robot cleaner of claim 10, wherein the location marks include two marks disposed separated from each other.

12. The robot cleaner of claim 11, wherein one of the two marks is a first mark shaped as a black circle and the other is a second mark shaped as a black circle having the same diameter as that of the first mark or a smaller diameter than that of the first mark.

13. The robot cleaner of claim 11, wherein one of the two marks is a first mark shaped as a black circle and the other is a second mark shaped as a black doughnut shape.

* * * * *